United States Patent
Chang et al.

(10) Patent No.: US 6,181,079 B1
(45) Date of Patent: Jan. 30, 2001

(54) HIGH POWER ELECTRONIC BALLAST WITH AN INTEGRATED MAGNETIC COMPONENT

(75) Inventors: Chin Chang, Yorktown Heights, NY (US); Adan F. Hernandez, Naperville, IL (US)

(73) Assignee: Philips Electronics North America Corporation, New York, NY (US)

(*) Notice: Under 35 U.S.C. 154(b), the term of this patent shall be extended for 0 days.

(21) Appl. No.: 09/467,596

(22) Filed: Dec. 20, 1999

(51) Int. Cl.[7] ................................................. H05B 37/02
(52) U.S. Cl. .................... 315/247; 315/224; 315/308; 315/312
(58) Field of Search ....................... 315/224, 225, 315/307, 308, 247, 244, DIG. 7, 276, 219, 324, 316, 312

(56) References Cited

U.S. PATENT DOCUMENTS

| | | | |
|---|---|---|---|
| 5,907,223 | * | 5/1999 | Gu et al. ............................... 315/247 |
| 5,925,990 | * | 7/1999 | Crouse et al. ........................ 315/308 |
| 6,008,594 | * | 12/1999 | Kita et al. ............................. 315/247 |

* cited by examiner

Primary Examiner—David Vu
Assistant Examiner—Wilson Lee
(74) Attorney, Agent, or Firm—Bernard Franzblau

(57) ABSTRACT

A high power electronic ballast for operating one or more discharge lamps includes a power factor correction high frequency converter input stage in cascade with an output stage made up of a half-bridge resonant converter. In place of the conventional isolation transformer in the output stage, the input stage utilizes a single integrated transformer inductor magnetic component, thereby eliminating the usual output stage isolation transformer. The input stage is operated in a critical conduction mode which further improves the electronic ballast.

13 Claims, 4 Drawing Sheets

HIGH POWER ELECTRONIC BALLAST WITH AN INTEGRATED MAGNETIC COMPONENT

BACKGROUND OF THE INVENTION

The present invention relates to an electronic ballast apparatus for operation of gas discharge lamps, and more particularly to a high power electronic ballast equipped with a unique and improved circuit topology that provides electric isolation from the AC power line voltage.

A conventional electronic ballast operated from a 60 Hz AC power line usually includes a two-stage converter circuit in order to supply a high frequency AC current to a load consisting of one or more gas discharge lamps. In order to provide protection against the hazard of an electrical shock, the output stage of the converter circuit is coupled to the lamp load via an isolation transformer, thereby providing electric isolation between the ballast output terminals and the converter circuit.

One example of an improved prior art electronic ballast is described in U.S. Pat. No. 5,084,653, which issued Jan. 28, 1992. This electronic ballast provides electric isolation in the front end stage of the apparatus. This patent describes an electronic ballast for powering three series connected fluorescent lamps with a 30 kHz lamp current and comprising a half-bridge series-resonance type inverter circuit powered from a substantially constant magnitude DC supply voltage derived from ordinary 60 Hz power line voltage by way of a bridge rectifier and a single transistor DC-to-DC converter using an energy storing inductor with an isolated secondary winding from which the DC supply voltage is derived. Thus, the DC supply voltage, the inverter circuit and the ballast output terminals are all electrically isolated from the AC power line and thereby provide protection against the hazard of an electric shock.

The front end stage of this electronic ballast is based upon a flyback DC-to-DC converter. This type of converter requires an energy-storing inductor which is a rather large and relatively expensive magnetic component, especially as compared with the inductors used in a boost converter or a single-ended primary inductor converter (SEPIC converter) with the same or comparable power ratings. Another disadvantage of the flyback converter is the large magnitude of its pulsating input current which usually requires larger EMI filters in order to achieve comparable EMC performance to that of a boost converter or a SEPIC converter.

Another prior art high frequency electronic ballast for gas discharge lamps is shown in the accompanying FIG. 1 of the drawings. This electronic ballast circuit basically consists of two building blocks. The front end is a boost converter for power factor correction and universal line voltage regulation. The main components are a transistor power switch Q1, an inductor L1, a diode D5 and the DC storage capacitor C1 along with an EMI filter and the diode bridge rectifier interposed between the AC supply voltage and the boost converter. The transistor switch Q1 is periodically switched on and off by a control circuit, for example, a Motorola Corporation product MC34262, as a function of the voltage across capacitor C1 and the current flowing the transistor switch Q1.

The back end is a typical voltage-fed half-bridge inverter loaded with a group of lamps via a resonant tank L2-C3. The main components are the power switches Q2 and Q3, resonant components including capacitor C3, inductor L2 and possibly the magnetizing inductance of the output transformer T1. The capacitors Clp in the secondary circuit of the transformer T1 are usually provided in order to ballast the lamp current and to protect against possible lamp rectification at the end of lamp life. There are four magnetic components in the circuit configuration shown in FIG. 1, i.e. the EMI filter L0, the boost choke L1, the resonant inductor L2 and the output isolation transformer T1. The operation of the power switches Q2 and Q3 is controlled by a high voltage control IC, for example, an IC UBA 2010 manufactured by Philips, as a function of current flow in transistor switch Q3 and the voltage on capacitor C3. Here too the size and cost of the magnetic components of the apparatus make this type of high frequency electronic ballast less than an optimal choice, especially from a competitive commercial viewpoint.

SUMMARY OF THE INVENTION

It is therefore an object of the invention to provide a high power electronic ballast having a reduced number of magnetic components with a concomitant reduction in the size and cost of the electronic ballast.

Another object of the invention is to provide a compact and inexpensive high power electronic ballast which uses a single integrated transformer-inductor combination in the ballast input stage that exhibits reduced power losses in the magnetic components.

A further object of the invention is a new and improved method of operating a high power electronic ballast. More specifically, the coupled inductor based SEPIC converter is designed to be operated in a boundary or critical conduction mode with variable frequency during the 60 Hz line cycle. The variable frequency range cound be, for example, from 50 kHz to 150 kHz. The control circuit along with the sensing arrangement of the invention leads to close to unity power factor at the line input terminal.

The above and other objects and advantages are achieved in accordance with the present invention wherein the isolation transformer is introduced into the power factor correction front end stage of the electronic ballast as a single integrated magnetic component that provides the electric isolation function as well as the converter inductor function. As a result, the output isolation transformer common in prior art high frequency electronic ballast circuits is no longer required.

The invention herein is based upon the following observations. In a prior art electronic ballast of the type shown in FIG. 1, a major function of the output transformer T1 is to provide electric isolation between the primary and the secondary in order to meet the ANSI safety requirements. In current-fed half-bridge converters, such an output transformer also serves as a resonant component and voltage gain booster. But, in a voltage-fed half-bridge inverter as shown in FIG. 1, the voltage gain can be obtained from the resonant tank consisting of inductor L2 and capacitor C3. Therefore, it is possible to remove the output transformer if the electric isolation is introduced into the front end part of the circuit. This results in a single magnetic component AC-DC converter with a power factor correction (PFC) front end stage providing galvanic isolation in cascade with a single magnetic component half-bridge resonant converter in accordance with the present invention.

The introduction of an isolated power factor correction front end stage employing a single magnetic component eliminates the requirement for the output transformer. As a result, the total number of magnetic components of the ballast circuit is reduced to three and the overall size and weight of the magnetic components are less than those of prior art electronic ballast circuits of the type described above. The related circuit losses and cost are reduced and further circuit miniaturization is now feasible.

In a preferred form of the invention, the front end stage of the high power electronic ballast utilizes a coupled inductor isolated SEPIC converter. The invention also contemplates the use of an isolated boost circuit as the front end stage of the electronic ballast.

In another advantageous form of the invention we provide an improved control function for the transistor switch in the PFC input stage of the apparatus, i.e. the apparatus is operated in a so-called critical conduction mode in which the transistor switch is turned on as soon as the input inductor current falls to zero. Prior art converters usually operate in a continuous conduction mode or in a discontinuous conduction mode.

In a continuous conduction mode (CCM) apparatus, the circuit efficiency is generally high (low losses) but the control circuit is more complex and therefore costly. In the discontinuous conduction mode (DCM) a simple control circuit is possible, but the circuit losses are higher. The critical conduction mode of the present invention has the advantage of a better tradeoff between the control complexity and the circuit losses than is possible with either of the two prior art control methods, i.e. CCM or DCM.

BRIEF DESCRIPTION OF THE DRAWINGS

The foregoing and other aspects of the invention will be described and elucidated in greater detail with reference to the accompanying drawings, in which.

DESCRIPTION OF THE PREFERRED EMBODIMENTS

Figure 1:
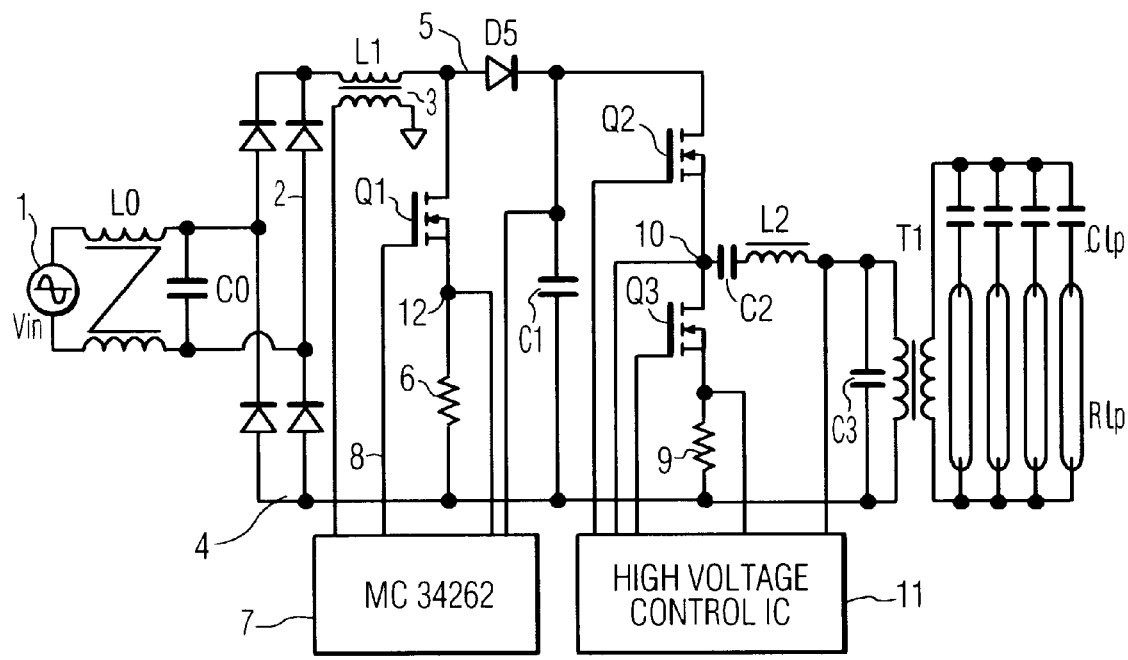
FIG. 1 shows a general circuit structure for a prior art high frequency electronic ballast which utilizes an isolation transformer in the output stage of a two-stage device.

FIG. 1 illustrates a general prior art high frequency electronic ballast circuit for operating one or more gas discharge lamps Rlp. A 50 or 60 Hz source of AC supply voltage 1 is connected to the input of an EMI filter consisting of a pair of magnetically coupled inductors LO and a capacitor CO. The output of the EMI filter is connected to a pair of input terminals of a 4 diode full wave bridge rectifier 2. A first DC output terminal of the bridge rectifier is connected to one terminal of a boost inductor Li which is part of a transformer 3. The second bridge rectifier output terminal is connected to a common line 4. The other terminal of inductor L1 is connected to a common junction point 5 between a diode D5 and a transistor power switch Q1.

A current sensing resistor 6 is connected in series circuit with the transistor power switch Q1 to the common line 4. The junction point 12 of transistor switch Q1 and the sensing resistor 6 is connected as a first control input to a control circuit 7, for example an integrated circuit manufactured by Motorola Corporation and designated MC34262. This control circuit is described in a technical data publication by Motorola Corporation published in 1993. The control circuit has an output line 8 that controls the on/off switching of transistor switch Q1.

The diode D5 is connected in series circuit with a storage capacitor C3 across the series circuit of transistor power switch Q1 and sensing resistor 6. An output stage is provided with a half-bridge inverter including transistor power switches Q2 and Q3 connected in series circuit with a further current sensing resistor 9 across the storage capacitor C1. A blocking capacitor C2 and a resonant inductor L2 are connected in series between a junction point 10 between transistor switches Q2 and Q3 and one terminal of the primary winding of an output isolation transformer T1. The other terminal of the transformer primary winding is connected to the common line 4. A resonant capacitor C3 is connected in parallel with the output transformer primary winding.

A control input line is coupled to a junction point between resonant inductor L2, resonant capacitor C3 and the one terminal of the primary winding and to a first control input terminal of a second control circuit 11 which has two output control lines coupled to respective control electrodes of switching transistors Q2 and Q3. A second control line couples the voltage developed across sensing resistor 9 to a second control input of the high voltage control circuit 11, for example, the integrated circuit UBA 2010. A third control line connects the junction point 10 to a third input of the control circuit 11. A high voltage control IC suitable for use as the control circuit 11 is described in UBA2010 Specification sheet by Philips.

The secondary winding of output transformer T1 is connected to a bank of four parallel connected discharge lamps Rlp via four respective series connected ballast capacitors Clp.

The transistor switch Q1 is periodically turned on and off by control signals delivered to its control electrode from control circuit 7 via the output control line 8. The control circuit 7 switches under the control of signals supplied by the secondary winding of boost inductor L1, the voltage on storage capacitor C1 and a signal determined by the current flow through transistor switch Q1. The input to the front end boost converter is a full wave rectified sinusoidal input line voltage at 50 Hz or 60 Hz. When the power switch Q1 is off the diode D5 is turned on and carries a current for storage capacitor C1 based upon the electric energy stored in the boost inductor L1. The voltage stored on capacitor C1 provides the operating voltage for the voltage fed half-bridge inverter including power switches Q2 and Q3. Inductor L2 and capacitor C3 form a resonant circuit at the switching frequency of the half-bridge inverter. The operation of this high frequency electronic ballast circuit is well known and will therefore not be described in further detail.

Figure 2:
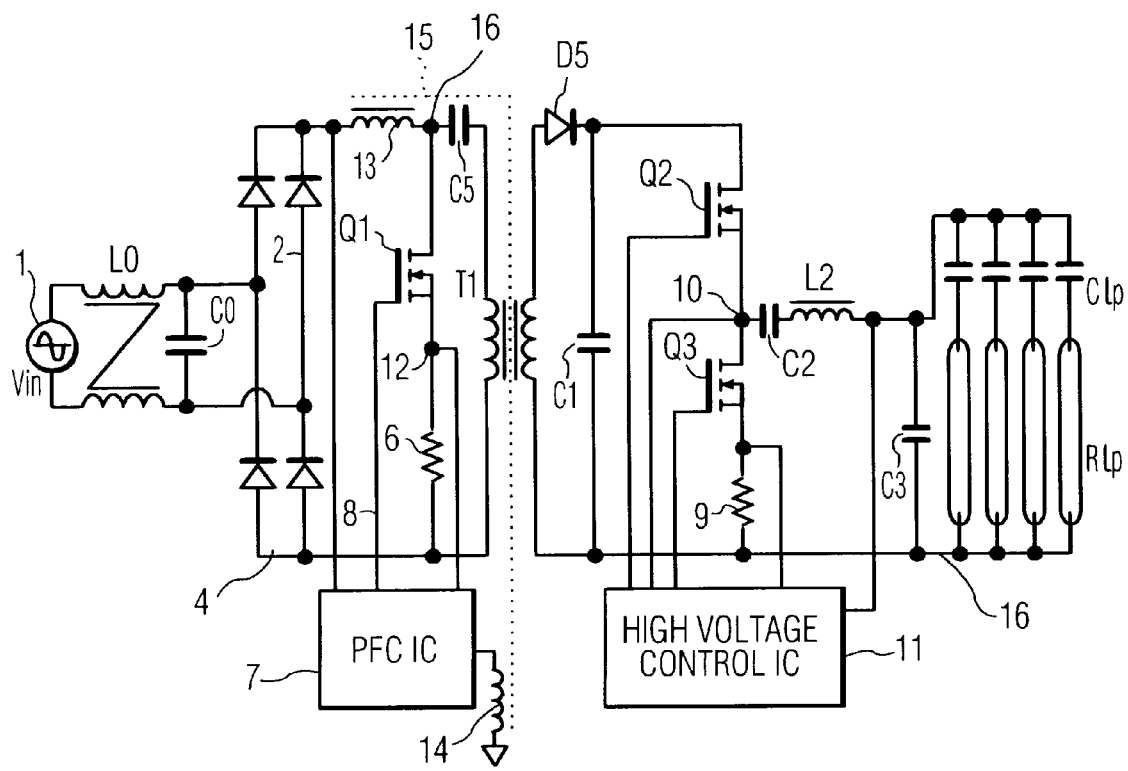
FIG. 2 is a preferred form of an electronic ballast in accordance with the invention which uses a SEPIC converter input state with a single integrated transformer-inductor.
Figure 4:
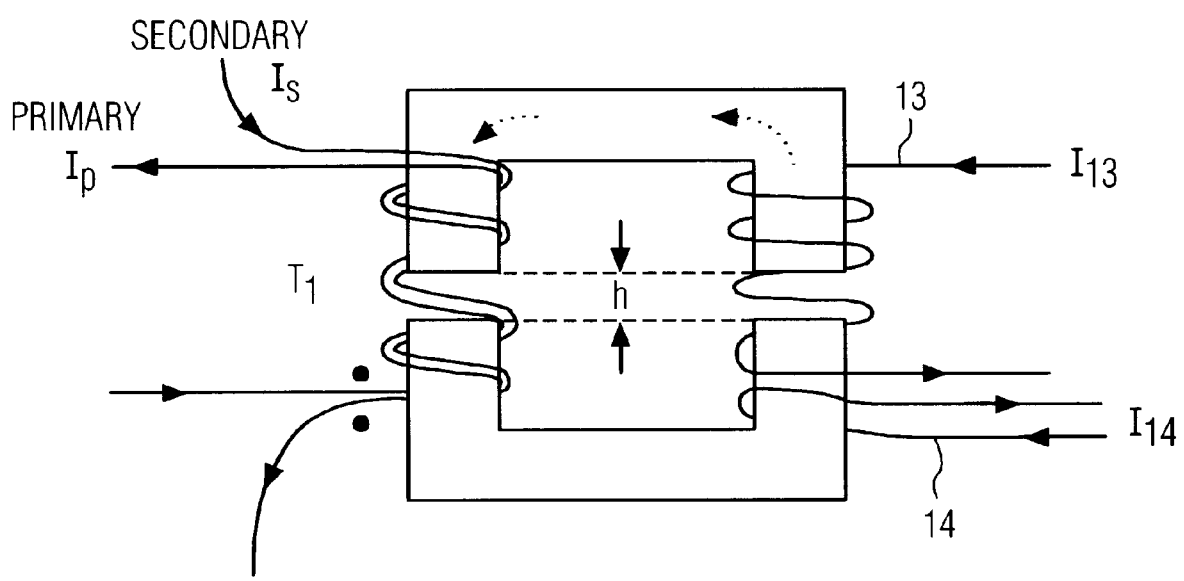

A preferred embodiment of the invention is shown in FIG. 2. A low frequency source of AC supply voltage 1, e.g. 50 Hz or 60 Hz, is connected to the input of an EMI filter consisting of a pair of magnetically coupled inductors L0 and a capacitor C0. The output of the EMI filter is connected to a pair of input terminals of a four diode full wave bridge rectifier 2. This part of the inverter is similar to FIG. 1 above. The high power electronic ballast circuit of FIG. 2 features a single integrated transformer-inductor combination T1-13. This transformer-inductor combination also includes a control winding 14. The transformer T1 primary winding, the inductor 13 and the control winding 14 are all mounted on a common magnetic core, as indicated schematically by the dashed line 15. One possible implementation of the transformer-inductor combination is shown in FIG. 4, which comprise a pair of magnetic c cores in facing relationship with an air gap of length h therebetween. The primary and secondary windings of the transformer T1 are closely wound together on the left hand legs of the c cores. The inductor winding 13 and the control winding 14 are wound in the right hand core legs as shown.

A series circuit including the inductor 13, a capacitor C5 and the isolation transformer primary winding is connected to first and second DC output terminals of the full wave bridge rectifier 2. A common junction point 16 between inductor 13 and capacitor C5 is connected via a second series circuit consisting of a transistor power switch Q1 and a sensing resistor 6 to the common line 4. The control winding 14 of the transformer-inductor is connected to a first control input of a control circuit 7 and to ground.

The junction point 12 between transistor switch Q1 and sensing resistor 6 is connected to a second control input of the control circuit 7 and the first DC output of the bridge rectifier circuit 2 is connected to a third control input of the control circuit 7. An output line 8 of the control circuit is connected to the control electrode (gate) of the switching transistor Q1. The control circuit 7 may again utilize the Motorola IC, MC34262.

The secondary winding of isolation transformer T1 is connected to the anode of diode D5 and to a further common line 16. The cathode of diode D5 is connected to one terminal of storage capacitor C1, whose other terminal is connected to the common line 16. Switching power transistors Q2 and Q3 of the half-bridge inverter are connected in series circuit with sensing resistor 9 between the cathode of diode D5 and the common line 16.

A blocking capacitor C2 is connected in series circuit with a resonant circuit including inductor L2 and capacitor C3 between the junction point 10 between switching transistors Q2 and Q3 and the common line 16. The junction point 10 is also connected to a control input of the high voltage control IC 11. The IC 11 is similar to the corresponding control circuit 11 of the apparatus of FIG. 1. A second control input of the high voltage control circuit 11 is connected to a junction point of the resonant inductor L2 and the resonant capacitor C3 so that this control input is responsive to the lamp voltage. The third control input of control circuit 11 is connected to the junction point of transistor switch Q3 and the sensing resistor 9 so that it receives a control signal determined by the current flow in the transistor switch Q3.

A parallel connected bank of four discharge lamps Rlp is connected in series with respective ballast capacitors Clp between the common line 16 and the junction point between the resonant inductor L2 and the resonant capacitor C3.

The SEPIC converter in FIG. 2 is operated in the critical conduction mode in order to provide good power factor correction. In contrast to the traditional control schemes such as a constant operating frequency with either a continuous conduction mode (CCM) or a discontinuous conduction mode (DCM), the critical conduction mode of operation described herein provides the advantage of a better tradeoff between the conflicting requirements of a simple control circuit and low circuit losses. As mentioned above, in the CCM mode the control is more complex although the circuit losses are relatively low, whereas in the DCM operation mode the control is simpler but the circuit losses are higher.

The input voltage, Vin, at the output of the bridge rectifier 2 is a full wave fluctuating replica of the 50 Hz or 60 Hz sinusoidal AC voltage of the supply voltage source 1. The control circuit 7 switches the transistor switch Q1 at a high frequency, for example, 50 KHz, so that for all intents and purposes for each cycle of this high switching frequency the low frequency input voltage, Vin, appears as a constant voltage as there is only a minute voltage change of Vin, at 50 Hz or 60 Hz, in one cycle of the 50 KHz frequency.

Figure 3A:
FIGS. 3A–3H show waveforms useful for a better understanding of the present invention.

FIG. 3A shows the waveform of current flow (IQ1) through the transistor switch Q1 as a function of time. When this transistor switch is turned on, the current IQ1 begins to ramp up from its initial value of zero. A current IL1 flows through inductor 13 and also begins to ramp up from its zero value, as shown by the waveform in FIG. 3B. The transistor switch Q1 continues to conduct during the period to to $t_1$. During this time period, a nearly constant voltage VL2, see FIG. 3C, appears across the primary winding of isolation transformer T1 and a current therein IL2, FIG. 3D, ramps up from its zero value. In this time period, a current IC5, FIG. 3E, flows through capacitor C5. At this time, diode D5 is off, see FIG. 3F, and there is no current flow through this diode, see FIG. 3G, current ID5. Therefore, there is no current flow, IC1, to capacitor C1, see FIG. 3H.

Figure 3B:
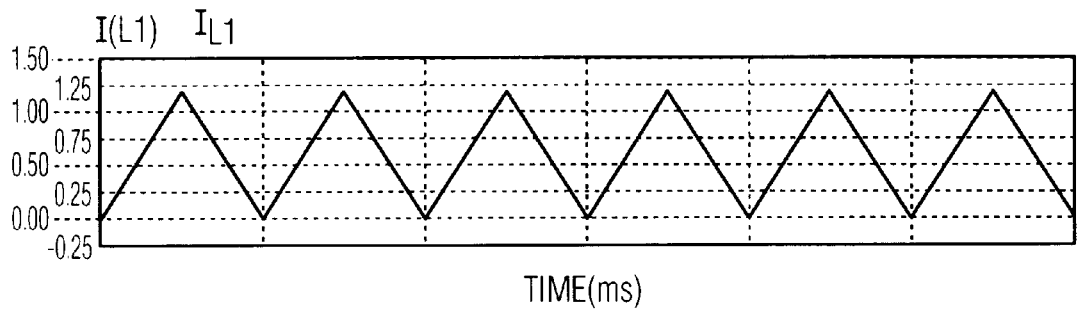
Figure 3C:
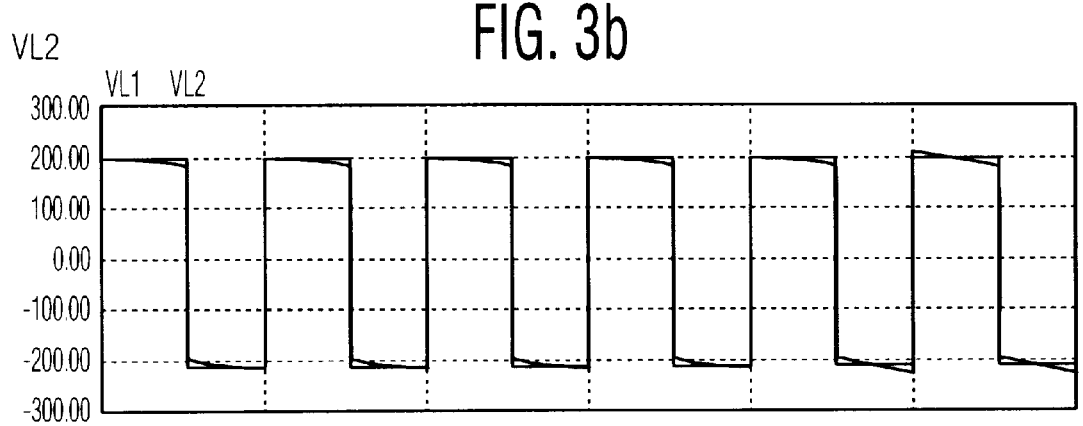
Figure 3D:
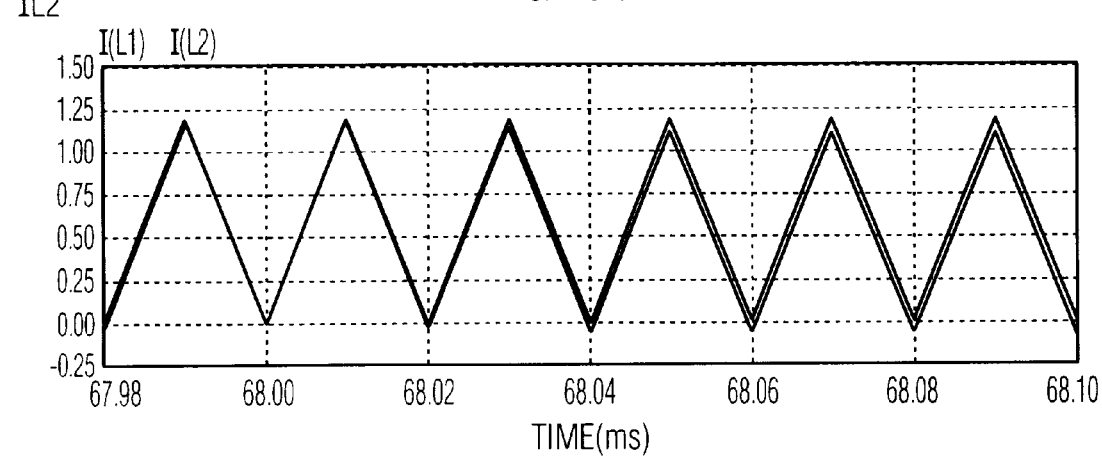
Figure 3E:
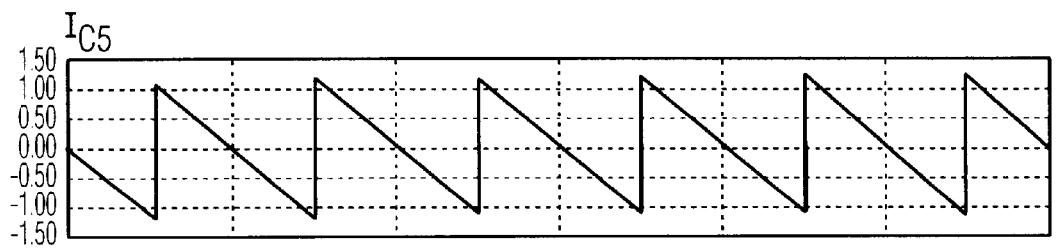
Figure 3F:
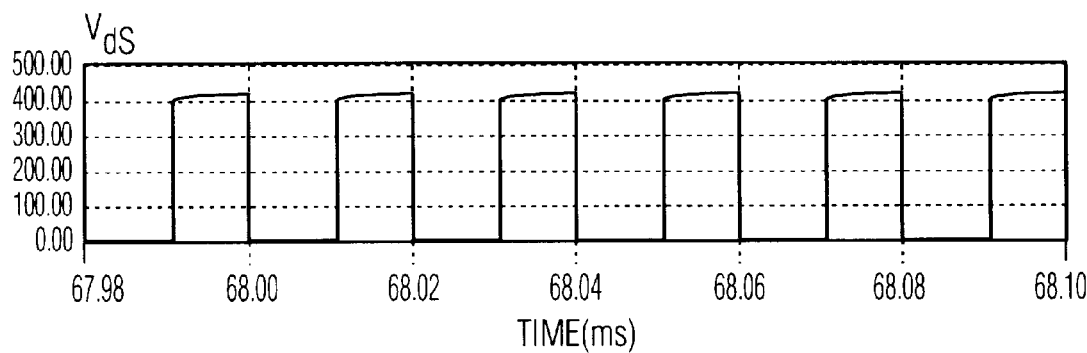
Figure 3G:
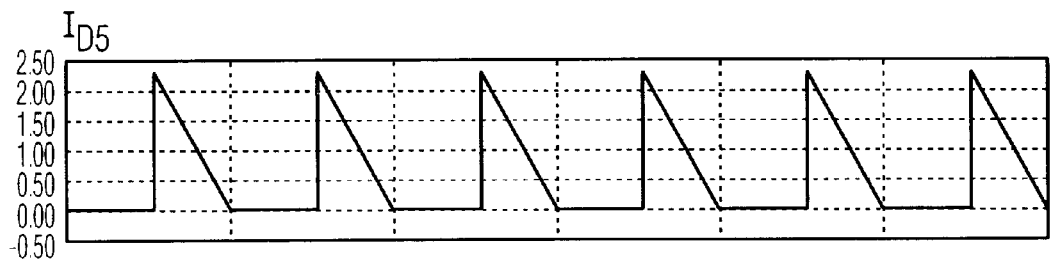
Figure 3H:

At the time instant t1, the voltage at the left-hand terminal of inductor 13 together with the voltage across the sense resistor 6 signal the control circuit 7 to turn off the transistor Q1. The current IQ1 in transistor Q1 drops rapidly to zero, the current IL1 through the inductor 13 begins to ramp down towards the zero value, the transformer primary voltage VL2, FIG. 3C, reverses polarity, whereupon the primary current IL2, FIG. 3D, begins to ramp down, the diode D5 now turns on and a diode current ID5, FIG. 3G, begins to flow. As a result, a charge current IC1 flows into capacitor C1 as shown in FIG. 3H.

At the time $t_2$, the current IL2 through inductor 13 or the transformer T1 primary winding becomes zero and via the control winding 14 of the transformer, the control circuit 7 receives a turn-on signal and immediately produces a turn-on signal for transistor switch Q1 over gate control line 8. The current IL1 in inductor 13 is also zero at this point in time, see FIG. 3B. The current IQ1 through transistor switch Q1 now begins to ramp up again and a new cycle as described above repeats itself. The diode D5 is again cut off and the only current IC1 that flows through capacitor C1 is that required to operate the half bridge inverter in the output stage and the discharge lamps energized thereby. The output voltage is essentially constant except for a very small ripple voltage.

The operation of the half-bridge resonant inverter output stage is conventional and need not be described in detail. The high voltage control circuit 11 alternately switches the transistor switches Q2 and Q3 on and off periodically as a function of control signals derived across the resonant capacitor C3 and the current sensing resistor 9.

In the electronic ballast of FIG. 2, due to the rectified sinusoidal input line voltage Vin, the input/output voltage gain, defined as Vo/Vin, is changed with time. In order to produce a sinusoidal input current in phase with the input line voltage, the SEPIC converter is operated in the critical conduction mode with a variable frequency during the input line frequency cycle. This operating mode is maintained by the PFC control IC by means of the voltage sense signal Vs developed in the transformer control winding 14.

In the high frequency operating interval, the power switch Q1 is turned on when the voltage sense signal Vs in control winding 14 reaches zero. With the turn on of switch Q1, the input line voltage Vin is applied to inductor 13. At the same time, the voltage across $C_5$, equal to $V_{in}$, is applied to the primary winding of transformer T1. The current in the magnetizing inductance is increased as shown in FIG. 3. The current in transistor Q1 increases approximately linearly (see FIG. 3A). At the same time, the energy storing capacitor C5 is discharged through transistor switch Q1 and the primary winding of transformer T1 with a current IC5 as shown in FIG. 3C. When the current peak of IQ1, with proper scaling of sensing resistor 6, reaches the level of a reference curve of the input voltage Vin at time $t_1$, the transistor switch Q1 is turned off. The circuit then enters its second operating interval. In this interval, diode D5 is on and conducts current from transformer T1 to the output capacitor C1. The current waveform ID5 of diode D5 is shown in FIG. 3G. In this interval, $t_1$–$t_2$, the voltage across transformer T1 leads to a gradual reduction of the inductor current IL1 as shown in FIG. 3B. When the current IL1 reaches zero, control winding 14 senses the signal (Vs) and triggers on transistor switch Q1 to start the next switching cycle.

The waveforms illustrated in FIG. 3 are derived only at a particular operating point during the low frequency line cycle. At other operating points, the shapes of the waveforms are the same, but with a different frequency and amplitude.

In comparison with the prior art circuit shown in FIG. 1, the invention in accordance with FIG. 2 uses a single integrated transformer inductor in the input stage rather than a separate inductor in the input stage and a separate isolation transformer in the output stage. The electronic ballast according to the invention has a reduced number of magnetic components resulting in a reduction in size and cost of the electronic ballast. As compared to the electronic ballast of U.S. Pat. No. 5,084,653, the invention of FIG. 2 utilizes magnetic components of reduced size and therefore reduced cost.

Although a preferred embodiment of the present invention has been shown and described herein, it will be obvious that such embodiment is provided by way of example only. Numerous variations, changes and substitutions will occur to those skilled in the art without departing from the spirit and scope of the invention. Accordingly, it is intended that the dependent claims cover all such embodiments as fall within the spirit of the invention.

What is claimed is:

1. A high frequency electronic ballast circuit for one or more discharge lamps comprising:
    first and second input terminals for connection to a source of low frequency supply voltage for the electronic ballast circuit,
    An input stage comprising;
        a transistor switch,
        a transformer-inductor having a primary winding, a secondary winding and an inductor,
        a capacitor,
        a rectifier,
        a storage capacitor,
        first means connecting the inductor, the capacitor, the transformer primary winding and the transistor switch to said first and second input terminals to form a high-frequency converter circuit,
        a control circuit supplying a high frequency switching signal to the transistor switch as a function of at least first and second control signals derived from said transformer-inductor,
        second means connecting the rectifier and storage capacitor to the transformer secondary winding, and
    an output stage comprising;
        a DC/AC inverter circuit including an LC resonant circuit,
        connection terminals for at least one discharge lamp, and
        means coupling ballast capacitor means to said connection terminals and to a resonant element of the LC resonant circuit.

2. The high frequency electronic ballast circuit as claimed in claim 1 wherein the control circuit operates said input stage in the critical conduction mode of operation.

3. The high frequency electronic ballast circuit as claimed in claim 2 wherein the transformer-inductor further comprises a control winding which supplies said first control signal to a first control input of the control circuit whereby the control circuit responds thereto so as to turn on the transistor switch when the current in the inductor reaches a zero value.

4. The high frequency electronic ballast circuit as claimed in claim 1 wherein the control circuit receives said first control signal at a first control input thereof and the control circuit responds thereto so as to turn on the transistor switch when the current in the inductor reaches a zero value.

5. The high frequency electronic ballast circuit as claimed in claim 1 wherein the control circuit is further responsive to a third control signal determined by a current flowing through the transistor switch for deriving the high frequency switching signal for the transistor switch.

6. The high frequency electronic ballast as claimed in 1 wherein the first connecting means connects the inductor, the capacitor and the transformer primary winding in series circuit to said first and second input terminals and connects the transistor switch to a junction point between the inductor and the capacitor and to the second input terminal.

7. The high frequency electronic ballast circuit as claimed in claim 1 wherein the transformer-inductor comprises a single integrated magnetic component including the inductor, the transformer primary and secondary winding, and a control winding for the control circuit, all on a common magnetic core means.

8. The high frequency electronic ballast circuit as claimed in claim 7 wherein the DC/AC inverter circuit comprises;
    second and third transistor switches connected in series across the storage capacitor, wherein
    the LC resonant circuit includes a resonant inductor and a resonant capacitor serially connected across the third transistor switch, and
    a high voltage control circuit for controlling the switching of the second and third transistors in response to third and fourth control signals determined by the voltage across the resonant capacitor and the current flow through the third transistor switch.

9. The high frequency electronic ballast circuit as claimed in claim 8 wherein the DC/AC inverter circuit further comprises a second capacitor serially connected with the resonant inductor and the resonant capacitor across the third transistor switch.

10. The high frequency electronic ballast circuit as claimed in claim 1 wherein the first and second input terminals are adapted to supply a low frequency full wave rectified sinusoidal-type supply voltage for the electronic ballast circuit.

11. The high frequency electronic ballast circuit as claimed in claim 1 wherein the first and second input terminals are adapted to supply a low frequency full wave rectified sinusoidal-type supply current for the electronic ballast circuit, and the inductor supplies said second control signal to a second control input of the control circuit whereby the control circuit triggers the transistor switch into cut-off when the current flow in the inductor is equal in amplitude to the amplitude of a low frequency supply current at the input terminals.

12. A method of operating a frequency converter of an electronic ballast wherein the frequency converter includes an inductor, a capacitor, an isolation transformer having a primary winding and a secondary winding, and a transistor switch, the method comprising:

applying a low frequency DC sinusoidal-type input current to input terminals of the frequency converter, and deriving first and second control signals for a control circuit which controls the switching of the transistor switch as a function of the first and second control signals, wherein the first control signal triggers the control circuit to turn on the transistor switch when a current in the inductor is zero, and the second signal triggers the control circuit to turn off the transistor switch when a current in the transistor switch reaches the level of the input current at the input terminal.

13. The operating method as claimed in claim 12 which further comprises, supplying, via the control circuit, a high frequency switching signal to the transistor switch thereby to alternately switch the transistor switch on and off at a high frequency relative to the low frequency input current.

* * * * *